(12) United States Patent
Castellucci et al.

(10) Patent No.: US 7,930,401 B2
(45) Date of Patent: *Apr. 19, 2011

(54) ACCESSING SHARED RESOURCES WITH IMPROVED REQUEST PEAK MANAGEMENT

(75) Inventors: Antonio Castellucci, Rome (IT); Roberto Guarda, Pomezia (IT)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/145,728

(22) Filed: Jun. 25, 2008

(65) Prior Publication Data

US 2009/0006627 A1 Jan. 1, 2009

(30) Foreign Application Priority Data

Jun. 26, 2007 (EP) .................................. 07111059

(51) Int. Cl.
*G06F 9/38* (2006.01)
*G06F 17/30* (2006.01)
(52) U.S. Cl. .................... 709/226; 370/329; 711/168
(58) Field of Classification Search .................. 370/329; 709/226
See application file for complete search history.

(56) References Cited

U.S. PATENT DOCUMENTS

| 5,577,101 | A | * | 11/1996 | Bohm | 455/406 |
|---|---|---|---|---|---|
| 6,393,468 | B1 | * | 5/2002 | McGee | 709/218 |
| 7,058,031 | B2 | * | 6/2006 | Bender et al. | 370/329 |
| 7,069,483 | B2 | * | 6/2006 | Gillies et al. | 714/712 |
| 7,120,706 | B2 | * | 10/2006 | Zievers | 710/6 |
| 7,417,956 | B2 | * | 8/2008 | Nakazawa | 370/252 |
| 7,743,146 | B2 | * | 6/2010 | Sadjadi | 709/225 |
| 2002/0135612 | A1 | * | 9/2002 | Royer et al. | 345/741 |
| 2008/0242281 | A1 | * | 10/2008 | King | 455/414.3 |

* cited by examiner

*Primary Examiner* — Ashok B Patel
*Assistant Examiner* — Andrew Goldberg
(74) *Attorney, Agent, or Firm* — Douglas A. Lashmit; Hoffman Warnick LLC (57) ABSTRACT

A solution is provided for accessing a shared resource in a data processing system (such as a server of a DAM application) by a plurality of exploiter entities (such as clients). A corresponding method starts with the step of monitoring an activity of each enabled entity being granted an access to the shared resource. The access granted to each enabled entity is released in response to the reaching of a first threshold (such as a time-out period) by an inactivity indicator, which is indicative of the non-activity of the enabled entity (such as an idle time). The method continues by detecting a critical condition of the shared resource (such as after reaching a maximum number of concurrent accesses). The access granted to an eligible enabled entity (or more) is released in response to the critical condition; the inactivity indicator of each eligible enabled entity reaches a second threshold preceding the first threshold (such as a grant period lower than the time-out period).

15 Claims, 8 Drawing Sheets

ACCESSING SHARED RESOURCES WITH IMPROVED REQUEST PEAK MANAGEMENT

FIELD OF THE INVENTION

The present invention relates to the data processing field. More specifically, the present invention relates to the access to shared resources in a data processing system.

BACKGROUND OF THE INVENTION

Shared resources are commonplace in modern data processing systems. Generally speaking, a shared resource consists of any (logical and/or physical) component, which can be accessed by multiple exploiters in turn. An example of shared resource is a server computer (or simply server), which offers a corresponding service to a large number of users accessing the server by means of their client computers (or simply clients). A typical application of the above-described client/server architecture is in Digital Asset Management (DAM) applications.

A problem of the servers (and more generally of any shared resources) is that they are intrinsically limited. For example, the users that are allowed to access each server concurrently cannot exceed a predefined maximum number. This limitation may be due to either objective or subjective constraints. Indeed, the processing capability of the server defines the number of connection sessions that can be established (between the server and the clients) for managing the corresponding accesses. In addition or in the alternative, the number of concurrent accesses may be reduced to ensure an adequate level of quality of the offered service, or according to specific license agreements (for example, relating the cost of the service to the number of concurrent accesses). In any case, after reaching the maximum number of concurrent accesses, any request to access the server by a further user is refused.

In order to mitigate this problem, the server typically implements a time-out mechanism. For this purpose, the server measures an idle time of each user accessing the server. When the idle time of the user reaches a time-out period, the corresponding access is released. In this way, it is possible to avoid keeping the server busy with useless connection sessions.

Typically, the time-out mechanism is implemented by means of a timer for each connection session (which timer is reset whenever the corresponding user submits any command to the server). Different optimization techniques are also available to facilitate the management of those timers. For example, U.S. Pat. No. 7,050,940 discloses a solution for efficiently managing a high number of timers for each connection session. For this purpose, the cited document proposes maintaining a global timer for each connection session, which global timer stores the value of the corresponding timer that will expire sooner; this reduces the time required to maintain and check the timers (since only the global timer needs to be processed for each connection session).

However, in this case as well further accesses to the server may not be granted (after reaching the maximum number of concurrent accesses) until the expiration of the first time-out period. This strongly limits the availability of the server; the problem is particular acute in applications (such as of the DAM type), which should guarantee the access to the server to the largest possible number of different users in any situation (for example, even in the case of a peak of access requests).

A different approach is instead based on the recycling of the connection sessions. In this case, each connection session processes the commands submitted by different users accessing the server in succession; these commands are maintained in a global queue, so as to be processed by the first connection session that is available. Particularly, as described in U.S. Pat. No. 6,988,140, once a user has become idle (since she/he has not submitted any command for a predefined period), the user releases the connection session and it is added to a poll subset. The server monitors all the users in the pool subsets; as soon as a user in the poll subsets returns active by submitting a further command to the server, this command is processed by the first available connection session (until the access is released by the user of his/her motion or by the server after reaching the time-out period). In this way, it is possible to disassociate the accesses from the connection sessions, thereby increasing the number of accesses that can be granted concurrently.

However, the above-described approach is not of general applicability. Indeed, in many cases the connection sessions cannot be recycled by different users. Typically, this happens when each connection session maintains specific context information (for example, relating to the corresponding user); therefore, the context information (being lost when the user releases the connection session) should be recollected whenever the same user submits a further command that is processed by another connection session. This causes an overhead of the server, which may be untenable in most practical cases. A typical example is in the above-mentioned DAM applications, wherein a complex handshaking procedure is typically implemented to identify and validate each user before granting the required access.

SUMMARY OF THE INVENTION

In its general terms, the present disclosure is based on the idea of using differentiated thresholds for releasing the accesses granted to the shared resource.

More specifically, an aspect of the invention proposes a method for accessing a shared resource in a data processing system (such as a server of a DAM application) by a plurality of exploiter entities (such as clients). The method starts with the step of monitoring an activity of each enabled entity being granted an access to the shared resource. The access granted to each enabled entity is released in response to the reaching of a first threshold (such as a time-out period) by an inactivity indicator, which is indicative of the non-activity of the enabled entity (such as an idle time). The method continues by detecting a critical condition of the shared resource (such as after reaching a maximum number of concurrent accesses). The access granted to an eligible enabled entity (or more) is released in response to the critical condition; the inactivity indicator of each eligible enabled entity reaches a second threshold preceding the first threshold (such as a grant period lower than the time-out period).

The proposed solution may be implemented in a system with client/server architecture (wherein a connection session storing context information of the corresponding enabled entity is established for each access).

Typically, the method finds application after reaching a maximum number of accesses that is allowed concurrently to the shared resource.

In an embodiment of the invention, a single eligible enabled entity (with the longest non-activity) is selected for releasing the corresponding access.

As a further improvement, it is possible to set the first threshold and/or the second threshold according to an estimated waiting indicator (being indicative of the maximum non-activity followed by further activity of each enabled entity).

Advantageously, this result is achieved by measuring the (actual) waiting indicators of a set of previous enabled entities.

Moreover, it is also possible to update the first threshold and/or the second threshold according to a frequency of the detection of the critical condition with no eligible enabled entities (for example, when a new access request is refused).

In addition or in the alternative, the first threshold and/or the second threshold may be updated according to a predefined time pattern (such as based on the hours and/or the date).

Other aspects of the invention propose a system and a computer program for performing the above-described method.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings.

DETAILED DESCRIPTION OF THE INVENTION

Figure 1:
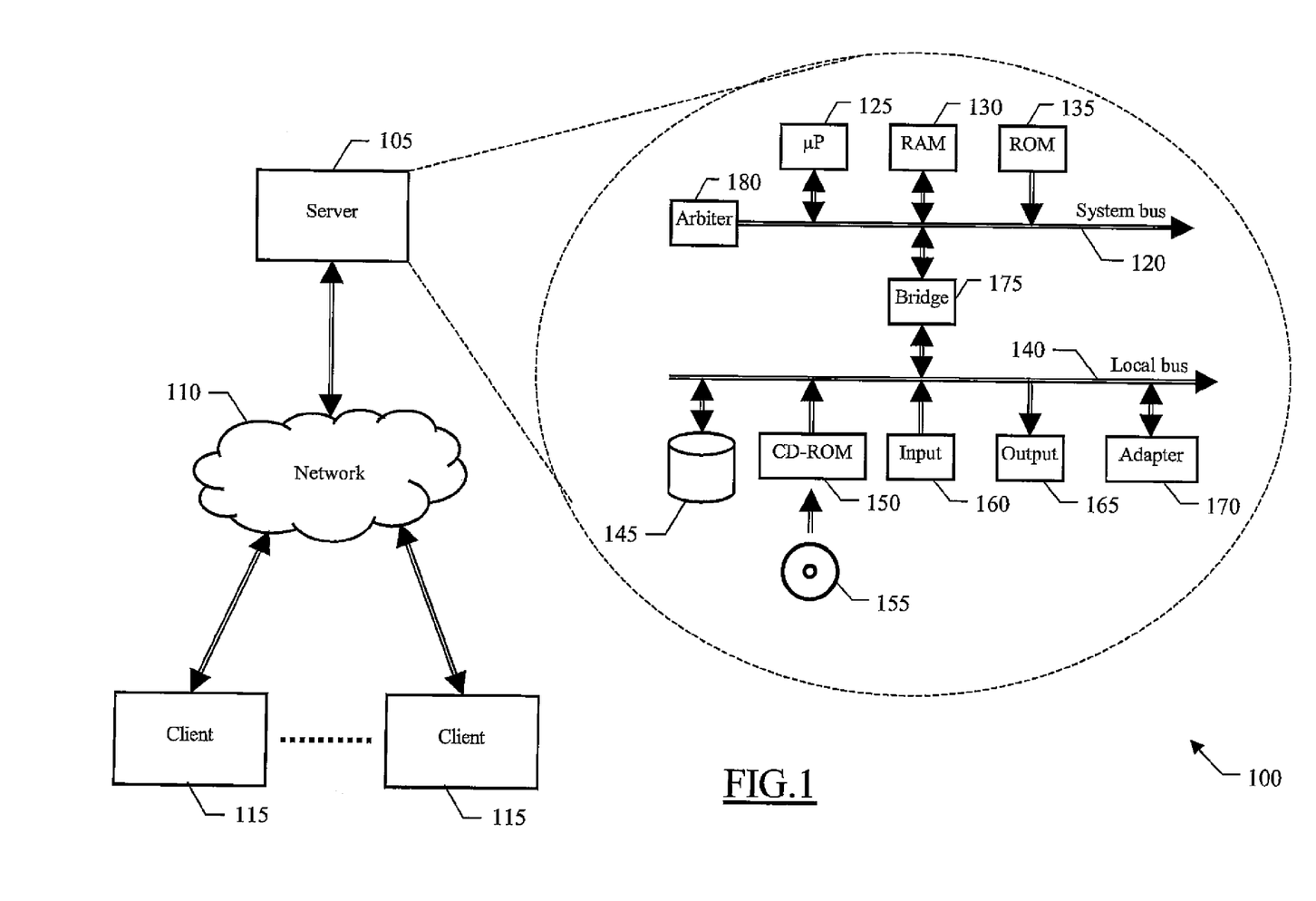
FIG. 1 is a schematic block diagram of a data processing system in which a solution according to an embodiment of the invention may be applied.

With reference in particular to FIG. 1, a distributed data processing system 100 is illustrated. The system 100 has a client/server architecture, typically based on the Internet. The Internet consists of millions of servers 105 (only one shown in FIG. 1), which are interconnected through a global communication network 110. Each server 105 offers one or more services. For example, in DAM applications the server 105 supports the acquisition, storage, and retrieval of digital assets; a digital asset is any artifact encoded in binary form, and includes any form of content (such as photographs, videos, music, and the like) together with the corresponding right to use them. Users of client computers 115 access the server 105 (e.g., via access providers for the Internet) in order to exploit an offered service.

Particularly, the server 105 comprises a computer that is formed by several units that are connected in parallel to a system bus 120. In detail, one or more microprocessors 125 control operation of the server 105; RAM 130 is directly used as a working memory by the microprocessors 125, and ROM 135 stores basic code for a bootstrap of the server 105. Several peripheral units are clustered around a local bus 140 (by means of respective interfaces). Particularly, a mass memory includes one or more hard-disks 145 and drives 150 for reading CD-ROMs 155. Moreover, the server 105 includes input units 160 (for example, a keyboard and a mouse), and output units 165 (for example, a monitor and a printer). An adapter 170 is used to connect the server 105 to the network 110. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

Figure 2:
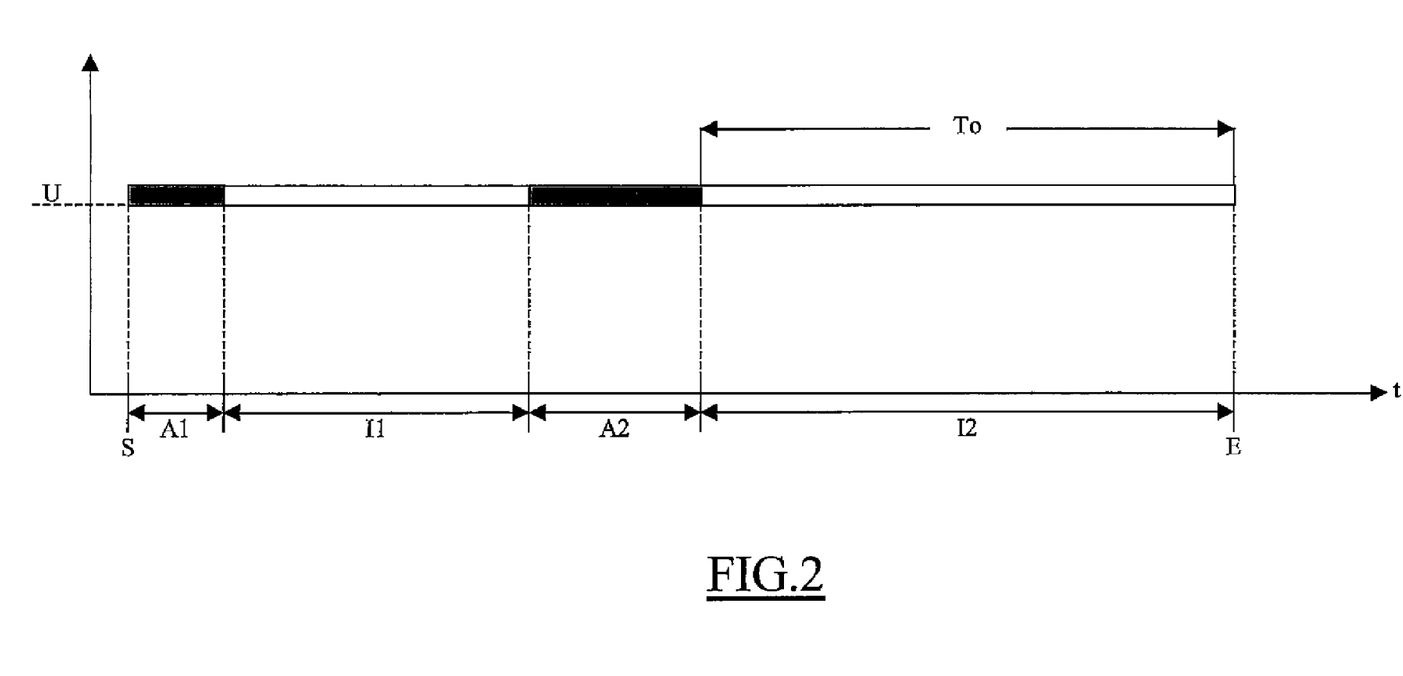
FIGS. 2-5 are explanatory diagrams of a solution according to an embodiment of the invention.

The typical activity over time (t) of a generic user (U) accessing the above-mentioned server 105 is illustrated in FIG. 2. Whenever the user U needs to access the server, he/she submits a corresponding request. The server allows a maximum number of concurrent accesses. Assuming that this maximum number of concurrent accesses has not been reached yet, the user U is granted access to the server at the time S. For this purpose, a corresponding connection session is typically established on the server with the client of the (enabled) user U. The connection session involves the creation (and its maintenance) of a descriptor, which includes context information of the user U (such as a personal profile, his/her permissions to act on the digital assets, and the like). For example, the context information can be obtained by means of a handshaking procedure for identifying and validating the user U (so as to verify whether he/she has the right to access the server).

The user U can then interact with the server. For this purpose, the user U submits a series of commands, which are processed by the server returning corresponding responses to the client of the user. These activity time(s)—such as A1 and A2—are represented with a dark bar in FIG. 2. For example, the activity times A1,A2 correspond to the upload of digital assets to the server, to the search of digital assets stored on the server, to their download onto the client, and the like. The user U may also remain without interacting with the server (i.e., with no command that is submitted after the access to the server has been granted or after the response to a previous command has been received). These idle time(s)—such as I1 and I2—are instead represented with a white bar in FIG. 2. For example, the idle times I1, I2 correspond to the choice of the commands to be submitted, to the playback of the received digital assets, and the like.

The user U can decide to release the access by his/her action at any time (e.g., by submitting a corresponding request). In any case, when the idle time reaches a threshold defining a time-out period To, the server forces the release of the access (with a preemptive action). The time-out period To (for example, To=1-5 minutes) represents the minimal idle time of the users that are no longer active any longer, since they have already obtained all the desired responses from the server (but have forgotten to release the access). To this extent, these (inactive) users are not expected to interact again with the server (i.e., to submit further commands). In the example at issue, the user U is forced to release the access at the time E (when the idle time I2 reaches the time-out period To).

Figure 3:
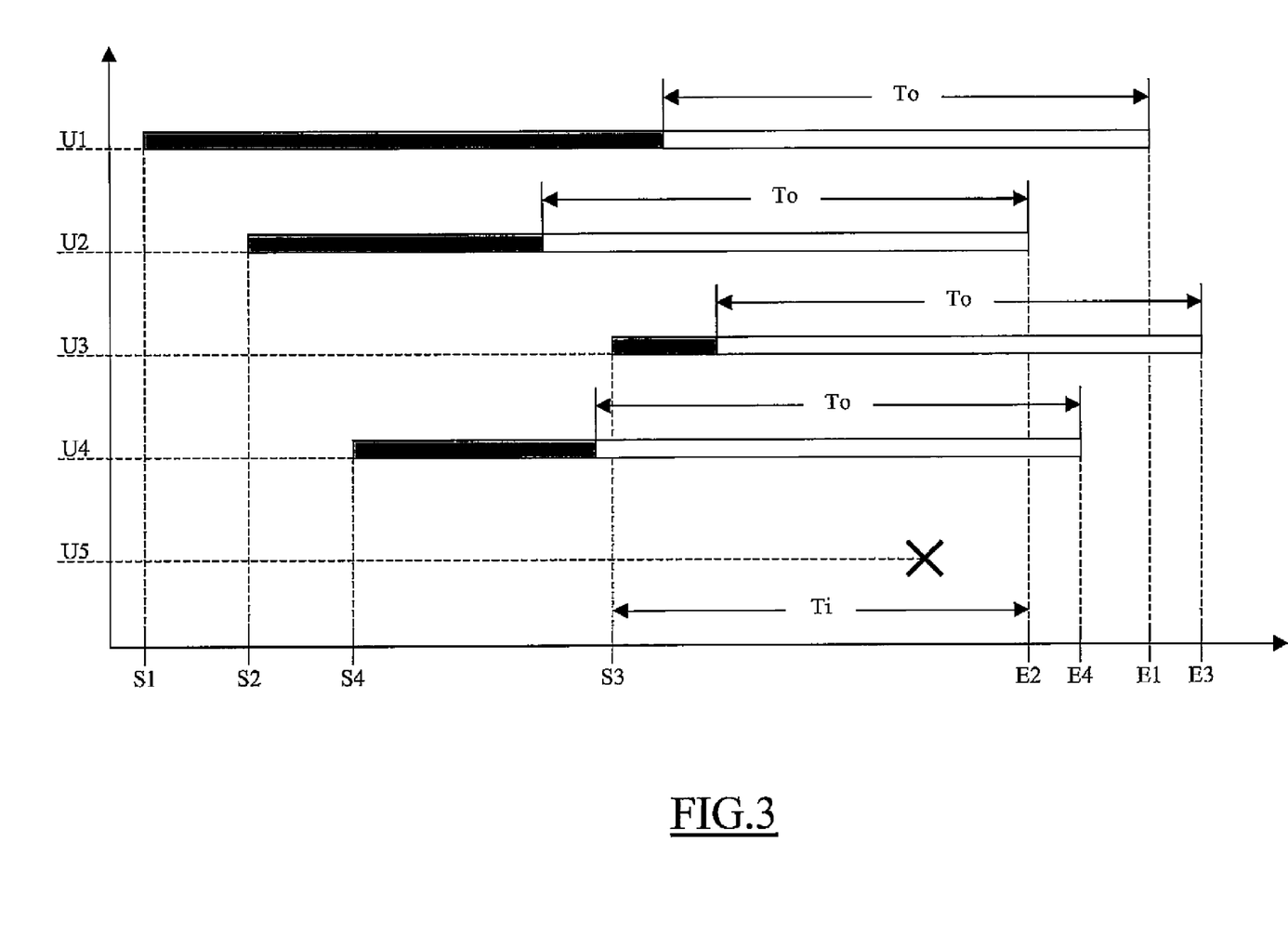

Moving now to FIG. 3, consider a scenario in which four different (enabled) users U1, U2, U3 and U4 access the server at the times S1-E1, S2-E2, S3-E3, S4-E4, respectively. Assuming that the maximum number of concurrent accesses is four, this limit is reached at the time S3. Therefore, any access request being submitted by a further user (denoted with U5) after the time S3 is refused—as denoted by a cross in the figure. The server remains unavailable (for the access by further users) until one of the enabled users U1-U4 releases his/her access. In the worst condition (in which none of the enabled users U1-U4 releases the access of his/her motion), this unavailability time Ti lasts until the idle time of one of the enabled users U1-U4 reaches the time-out period To. In the example at issue, the unavailability period Ti is from the time S3 (access granted to the user U3) to the time E2 (access released by the user U2).

Figure 4:
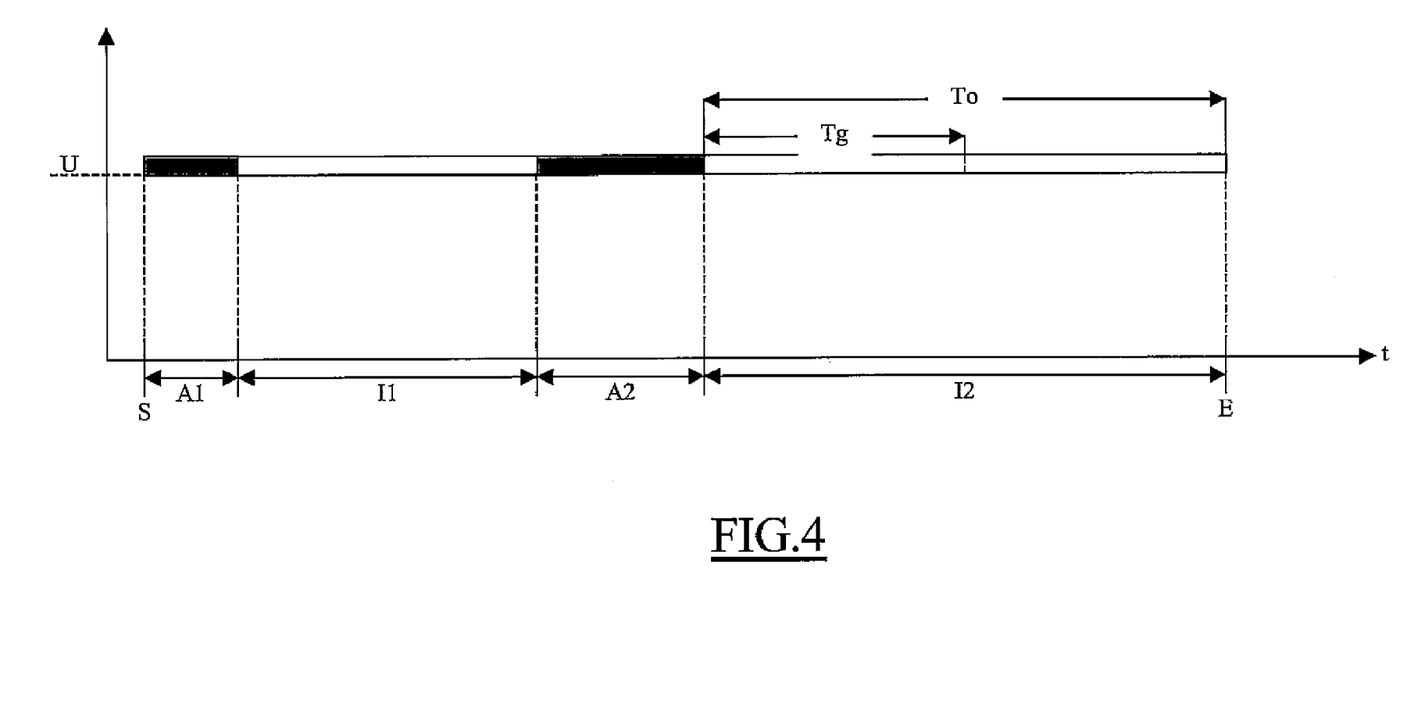

With reference instead to FIG. 4, in a solution according to an embodiment of the present invention, a further threshold for the idle time is introduced. This threshold defines a grant period Tg, which is lower than the time-out period To (for example, Tg=0.5-2.5 minutes). The grant period Tg represents an operative idle time, comprising the maximum idle time of the users that are still active (e.g., the users have not obtained yet all the desired responses from the server or the users intend to submit further commands to the server, etc. Conversely, when the idle time of a user exceeds the grant period Tg, it is likely that this user is inactive (i.e., his/her idle time will reach the time-out period To later on). In view of the above, when a further access request is submitted after reaching the maximum number of concurrent accesses, it is possible to release an access whose idle time has already exceeded the grant period Tg (even if it has not yet reached the time-out period To).

Figure 5:
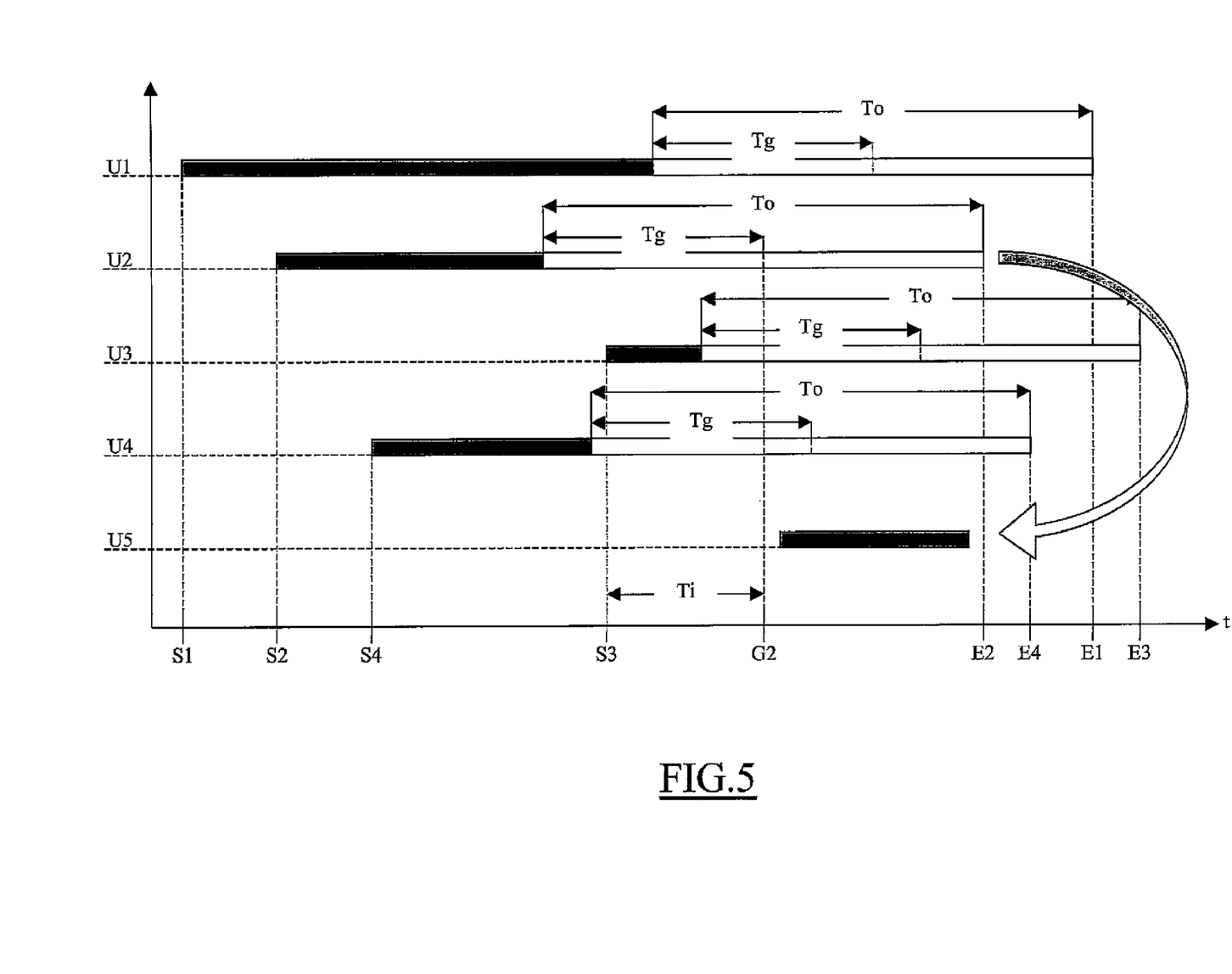

For example, repeating in FIG. 5 the same scenario of FIG. 3, the user U5 again submits an access request after the server has reached the maximum number of concurrent accesses (from the time S3 to the time E2). In this case, however, when the idle time of one of the enabled users U1-U4 has reached the grant period Tg, the server forces the release of his/her access (in response to the further access request). Access to the server can then be granted to the user U5. Therefore, in the worst condition (in which none of the enabled users U1-U4 releases the access), the unavailability time Ti only lasts until the first idle time reaches the grant period Tg (before the time-out period To). In the example at issue, the enabled user U2 reaches the grant period Tg at the time G2, so that the unavailability period Ti is from the time S3 to the time G2. Starting from the time G2, the access request from the user U5 may be granted, after the access of the enabled user U2 has been released (as indicated by the large arrow in FIG. 5). It should be noted that the grant period Tg is taken into account only when an access request is received after reaching the maximum number of concurrent accesses. In other words, absent any such access request, the accesses are maintained until they are released as usual (by the corresponding users of their own motion or by the server after reaching the time-out period To).

The present invention strongly increases the availability of the server, which is important in applications (such as of the DAM type), which guarantee access to the server to the largest possible number of different users in any situation (for example, even in the case of a peak of access requests).

The above-described approach is of general applicability. Indeed, each connection session remains dedicated to a specific user. In this way, the corresponding context information is maintained until the access to the server is released. Therefore, no overhead (for recollecting the context information like in connection sessions that are recycled) is added to the server. For example, this is clearly perceived in DAM applications (since the repetition of any handshaking procedure is prevented).

Figure 6:
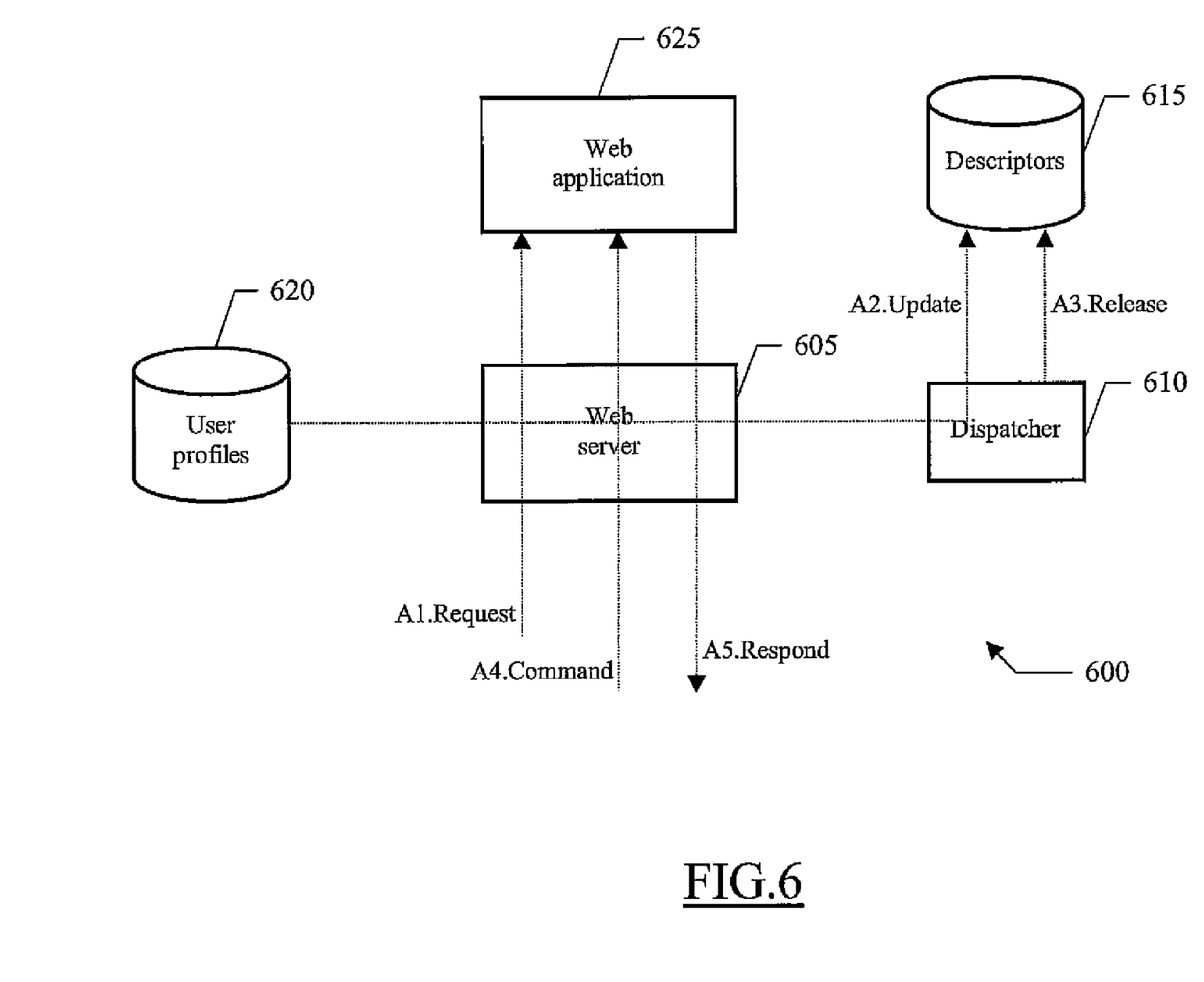
FIG. 6 is a collaboration diagram representing the roles of different software components that may be used to implement a solution according to an embodiment of the invention.

Moving to FIG. 6, illustrative software components that can be used to implement the above-described solution are denoted as a whole with the reference number 600. The information (programs and data) is typically stored on the hard-disk and loaded (at least partially) into the working memory of the server when the programs are running, together with an operating system and other application programs (not shown in FIG. 6). The programs are initially installed onto the hard disk, for example, from CD-ROM. Particularly, FIG. 6 depicts the static structure of the system (by means of the respective components) and its dynamic behavior (by means of a series of exchanged messages, each one representing a corresponding action, denoted with sequence numbers preceded by the symbol "A").

In detail, a web server 605 receives all the requests submitted by the clients of the users, not shown in FIG. 6, through corresponding browsers (action "A1.Request"). For example, the users may submit a request to access the server or a request to release their accesses.

The web server 605 interfaces with a dispatcher 610, which controls all the communication sessions on the server. For this purpose, the dispatcher 610 accesses a repository 615, which stores the descriptor of each connection session (for the corresponding context information). In more detail, the web server 605 updates the repository 615, through the dispatcher 610, according to the request submitted by the users (action "A2.Update"). For example, when an access request is received by a further user before reaching the maximum number of concurrent accesses, the web server 605 performs the handshaking procedure required to identify and validate the user, according to the content of a repository 620 storing the profiles of all the users being authorized to access the server, and then adds a new descriptor with the context information so obtained to the repository 615. Conversely, when a release request is received by an enabled user, the corresponding descriptor is removed from the repository 615.

At the same time, the dispatcher 610 monitors the content of the repository 615. When it is necessary, the dispatcher 610 releases the accesses granted to the enabled users, by removing the corresponding descriptors from the repository 615 (action "A3.Release"). Particularly, this happens as soon as the idle time of each access reaches the time-out period. The same behavior is experienced when an access request is received after reaching the maximum number of concurrent accesses with the idle time of at least one access that exceeds the grant period.

The web server 605 also receives all the commands submitted by the enabled users (action "A4.Command"). The web server 605 passes each command to a relevant web application 625 (of the DAM type in the example at issue), which exposes a corresponding Application User Interface (API). The web application 625 processes each command, and returns the corresponding response to the client through the web server 605 (action "A5.Respond").

Figure 7A:
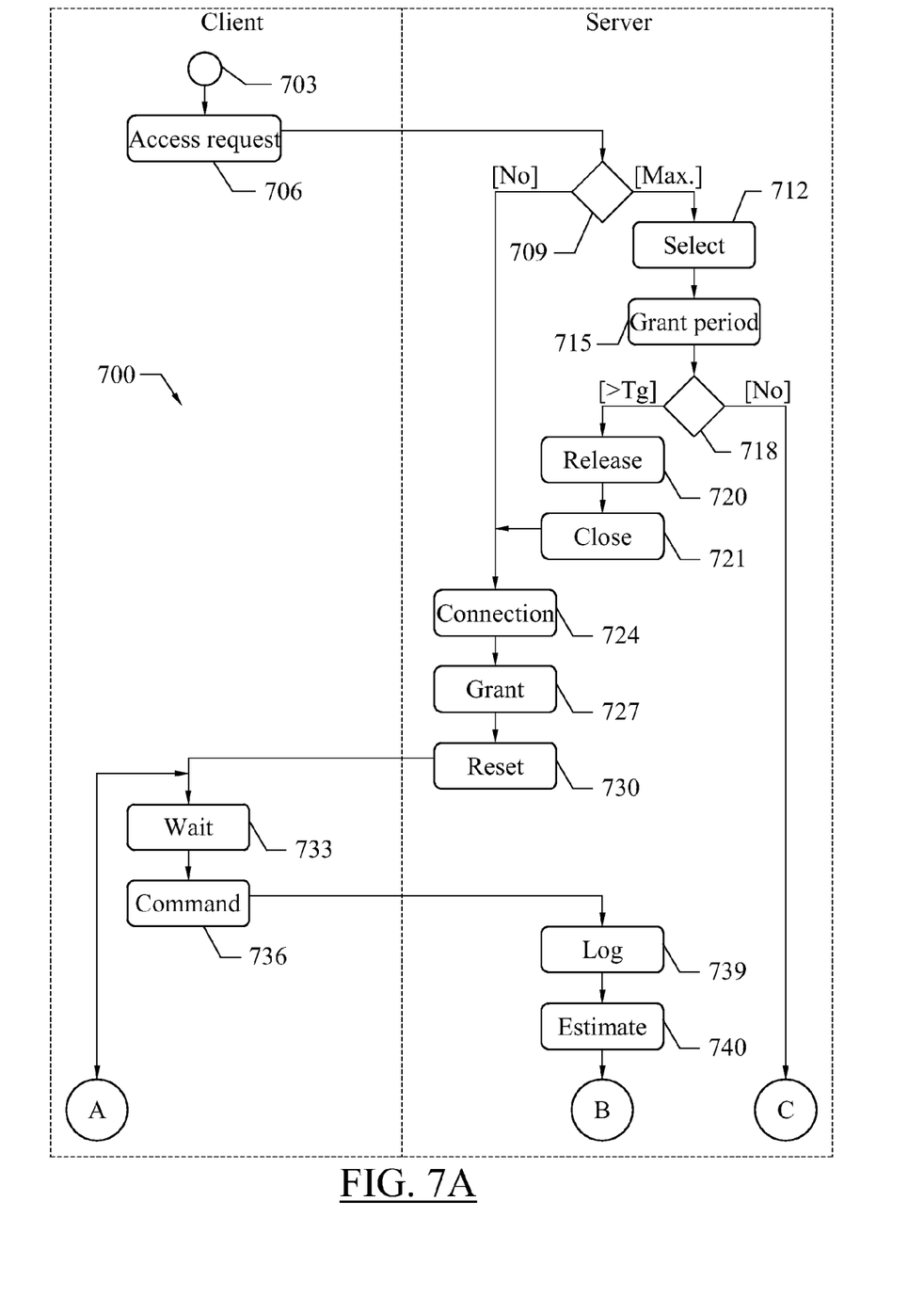
FIG. 7 is a diagram describing a flow of activities relating to an implementation of a solution according to an embodiment of the invention.
Figure 7B:
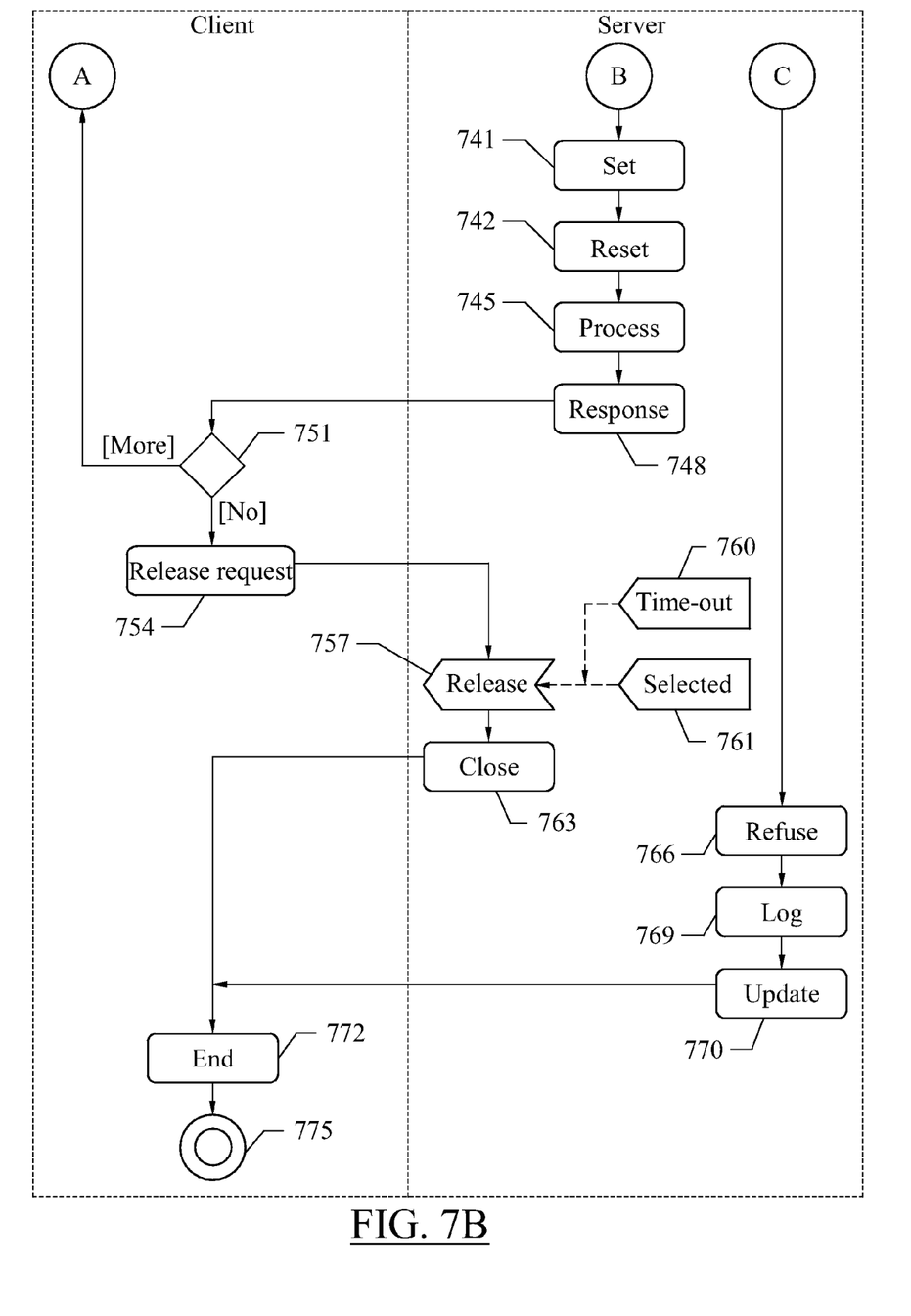

Considering now FIGS. 7A-7B, the logic flow of an exemplary process that can be implemented in the above-described system (to manage the accesses to the server) is represented with a method 700. The method begins at the black start circle 703 in the swim-lane of a generic client. Whenever the user of the client needs to access the server, he/she submits a corresponding request at block 706.

In response thereto, the server at block 709 verifies whether the maximum number of concurrent accesses has been reached. If so, the flow of activity descends into block 712, wherein the enabled user with the longest idle time is selected. Continuing to block 715, the server determines the current value of the grant period. In an embodiment of the present invention, the grant period is set to a value that changes according to a predefined time pattern. In other words, the grant period can depend, for example, on a time frame of the access request (i.e., its hours and/or date). For example, it is possible to increase the grant period during the weekends and at night (when the frequency of the access requests decreases, so that the probability of having the server unavailable is low). Conversely, it is possible to reduce the grant period during working days (when the frequency of the access requests raises, so that the probability of having the server unavailable is high). This additional feature adds further flexibility to the proposed solution.

With reference now to block 718, the idle time of the selected enabled user is compared with the grant period. If this idle time exceeds the grant period, the server forces the release of the corresponding access at block 720. Proceeding to block 721, the connection session associated with the access is closed (by discarding the corresponding descriptor with the relevant context information). The method then descends into block 724. Block 724 is also reached from block 709 when the maximum number of concurrent accesses has not yet been reached. In both cases, a further connection session for the (new) user is established. For this purpose, the server collects the context information relating to the user (by means of a handshaking procedure), and adds it to a corresponding descriptor. The access to the server is then granted to the user at block 727. At the same time, a counter being used to measure idle time (continuously running in the background) is reset at block 730.

Returning to the swim-lane of the client of the (freshly enabled) user, a waiting condition is entered at block 733 (for example, while the user is choosing the first command to be submitted to the server). The method continues to block 736 as soon as the user has selected the desired command (for example, to upload, search or download specific digital assets). The command is then submitted to the server. In response thereto, the server at block 739 logs the current idle time (as indicated by the corresponding timer). Continuing to block 740, the logged information is used to estimate the operative idle time of the users that are still active. For example, the operative idle time may be set to the running average of the longest idle times (followed by the submission of a further command) for a set of previous accesses (such as the last 100-1.000), filtered to remove any sharp variation thereof. The operative idle time so estimated is then used at block 741 to calculate the grant period. For example, the grant period may be set to a predefined percentage of the operative idle time (such as 105-110%). This additional feature allows updating the grant period dynamically according to the changing behavior of the users. The method then continues to block 742, wherein the counter is reset (so as to start again measuring the idle time).

Considering now block 745, the server processes the command received from the client. This may involve, for example, storing uploaded digital assets, searching the available digital assets, or retrieving the required digital assets. Proceeding to block 748, the server returns a corresponding response to the client (such as a return code of the uploading, a list of the digital assets satisfying the desired search, or the selected digital assets). The flow of activity then branches at block 751 in the swim-lane of the client. If the user wishes to submit further commands to the server, the flow of activity returns to the block 733 for repeating the same operations described above. Particularly, the client again enters a waiting condition (for example, while the user is choosing the next command to be submitted to the server or is playing-back the received digital assets). Conversely, when the user decides to release the access, a corresponding request is submitted to the server at block 754.

In response thereto, the server at block 757 releases the access being granted to the user. Block 757 is also reached in a completely asynchronous manner from block 760 or from block 761. Particularly, the method passes from block 760 to block 757 when the corresponding idle time reaches the time-out period. The method instead passes from block 761 to block 757 when, in response to the access request from another user after reaching the maximum number of concurrent accesses, the corresponding idle time is the highest one and it exceeds the grant period. In any case, the flow of activity then proceeds from block 757 to block 763, wherein the connection session associated with the access is closed (again by discarding the corresponding descriptor with the relevant context information).

Referring back to block 718, if the idle time of the selected enabled user does not reach the grant period (when the access request has been submitted by the new user after reaching the maximum number of concurrent accesses), the method descends into block 76. In this case, the server refuses the access to the user (since no access can be released without adversely affecting the enabled users). The event is logged at block 769. Continuing to block 770, the logged information is used to calculate a frequency of the refusals (for example, according to their number over a predefined period, such as the last day, week or month). The refusal frequency so obtained is then used to update the grant period. For example, the grant period may be divided by a correction factor proportional to the refusal frequency (such as from 0.5 to 1.5). This additional feature allows self-adapting the grant period to the different environmental conditions.

Returning to the swim-lane of the client, the block 772 is reached from block 763 (access released) or from block 770 (access refused). In both cases, the interaction of the user with the server ends at this point. The method then terminates at the concentric white/black stop circles 775.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment. as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

More generally, the proposed solution lends itself to be applied to manage the access to any other logical and/or physical shared resource (such as files, databases, disks, printers, scanners, and the like) by whatever logical and/or physical exploiter entity (such as operating systems, software applications, routers, switches, and the like).

Moreover, it is possible to monitor the activity of each user (to which the access to the server has been granted) in a different way, for example, by managing the timers or any equivalent structure as disclosed in the above-mentioned document U.S. Pat. No. 7,050,940. The idle time may also be measured in another way (for example, by filtering sporadic commands), or it may be replaced by any similar inactivity indicator (for example, equal to the incremental idle time of the user during the whole access to the server). Likewise, the proposed values of the time-out period and/or the grant period are merely illustrative. More generally, the grant period may be set to any value preceding the time-out period according to the measure of the idle time (for example, with the grant period that is higher than the time-out period when a down-counter is used to detect its expiration).

Although the proposed solution has been described with reference to DAM applications, this is not to be interpreted in a limitative manner. Indeed, similar considerations apply to any other server offering whatever service to equivalent clients (for example, implementing an instant messaging service). Likewise, it is possible to collect the context information with any other procedure (such as requiring the user to enter personal information). This context information may be stored in any element equivalent to the above-mentioned descriptor (even with a distributed structure). However, nothing prevents exploiting the proposed solution when the access to the shared resource does not require the establishment of any communication session (such as for local hardware devices).

Similar considerations apply if the maximum number of concurrent accesses is defined in another way (for example, according to hardware constraints). However, the proposed solution lends itself to be applied in response to the detection of different critical conditions (such as when the time required to find the server available exceeds an acceptable value, or when the quality of the service falls below a limit to be guaranteed).

In different embodiments of the invention (when other critical conditions are detected), there is not excluded the possibility of releasing two or more accesses (whose idle times have reached the grant period).

Alternatively, it is possible to set the grant period in a different way (for example, simply to a predefined percentage of the time-out period).

Moreover, nothing prevents estimating the operative idle time with other algorithms (for example, based on fuzzy-logic techniques). Similar considerations apply to any equivalent waiting indicator (for example, based on the incremental idle time).

Likewise, the refusal frequency, or more generally the frequency of the detection of the critical condition with no access eligible to the released, since its idle time does not reach the grant period, may be measured in a different way (for example, as a percentage of the accesses that are refused with respect to the accesses that are granted).

Moreover, equivalent algorithms may be used to update the grant period and/or the time-out period according to any other time pattern (for example, based on machine learning techniques).

More generally, it is possible to define the grant period, the time-out period or both of them according to one or more generic parameters indicative of whatever environmental conditions (such as a current workload of the server). However, nothing prevents using fixed values for one or more of the grant and time-out periods.

Similar considerations apply if the program (which may be used to implement each embodiment of the invention) is structured in a different way, or if additional modules or functions are provided. Likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code, for example, to be compiled or interpreted). Moreover, it is possible to provide the program on any computer-usable medium, which can be any element suitable to participate in containing, storing, communicating, or transferring the program. For example, the medium may be of the electronic, magnetic, optical, electromagnetic, infrared, or semiconductor type. Examples of such medium are fixed disks (where the program can be pre-loaded), removable disks, tapes, cards, wires, fibers, wireless connections, networks, broadcast waves, and the like. In any case, a solution according to an embodiment of the present invention lends itself to be implemented with a hardware structure (for example, integrated in a chip of semiconductor material), or with a combination of software and hardware.

The proposed method may be carried out on a system having a different architecture or including equivalent units (for example, based on a local network). Moreover, each computer may include similar elements (such as cache memories temporarily storing the programs or parts thereof to reduce the accesses to the mass memory during execution). In any case, it is possible to replace the computer with any code execution entity (such as a PDA, a mobile phone, and the like), or with a combination thereof (such as a multi-tier server architecture, a grid computing infrastructure, and the like).

Although in the preceding description reference has been made to an implementation on an actual server (or any other data processing system), this is not to be intended as a limitation. Indeed, in a different embodiment of the invention the same solution may also be implemented by means of a service, which is deployed by a corresponding provider.

The foregoing description of the embodiments of this invention has been presented for purposes of illustration and description. It is not intended to be exhaustive or to limit the invention to the precise form disclosed, and obviously, many modifications and variations are possible.

The invention claimed is:

1. A method for accessing a shared resource in a data processing system, comprising:
   monitoring an activity of an entity granted access to the shared resource, wherein a plurality of entities have been granted access to the shared resource, and wherein a maximum number of granted accesses is allowed concurrently to the shared resource;
   releasing the access granted to the entity in response to an inactivity monitor reaching a first threshold indicative of a non-activity of the entity;
   detecting a critical condition of the shared resource, the detecting including receiving a request for accessing the shared resource from another entity after reaching the maximum number of accesses;
   releasing the access granted to the entity in response to the critical condition when the inactivity indicator of the entity reaches a second threshold lower than the first threshold;
   determining an estimated waiting indicator by:
      determining actual longest idle times between granted accesses to the shared resource for a set of the plurality of entities;
      calculating a running average of a set of the actual longest idle times; and
      setting the estimated waiting indicator to a predefined percentage of the running average;
   and
   setting at least one of the first threshold and the second threshold according to the estimated waiting indicator.

2. The method according to claim 1, wherein the shared resource includes a server offering a service and the entity includes a client for accessing the server for exploiting the service, further comprising:

establishing a connection session on the server for the client, the connection session including a maintenance of a descriptor including context information of the client; and wherein releasing the access further comprises closing the connection session and discarding the descriptor of the closed connection session.

3. The method according to claim 1, further comprising:
selecting an entity from the plurality of entities whose inactivity indicator is indicative of the longest non-activity; and
releasing the access granted to the selected entity.

4. The method according to claim 1, further comprising:
measuring a frequency of the detection of the critical condition; and
updating at least one of the first threshold and the second threshold according to the frequency.

5. The method according to claim 1, further comprising:
updating at least one of the first threshold and the second threshold according to a predefined time pattern.

6. A program product stored on a non-transitory computer readable medium, which when executed, accesses a shared resource in a data processing system, comprising program code for:
monitoring an activity of an entity granted access to the shared resource, wherein a plurality of entities have been granted access to the shared resource, and wherein a maximum number of granted accesses is allowed concurrently to the shared resource;
releasing the access granted to the entity in response to an inactivity monitor reaching a first threshold indicative of a non-activity of the entity;
detecting a critical condition of the shared resource, the detecting including receiving a request for accessing the shared resource from another entity after reaching the maximum number of accesses;
releasing the access granted to the entity in response to the critical condition when the inactivity indicator of the entity reaches a second threshold lower than the first threshold;
determining an estimated waiting indicator by:
 determining actual longest idle times between granted accesses to the shared resource for a set of the plurality of entities;
 calculating a running average of a set of the actual longest idle times; and
 setting the estimated waiting indicator to a predefined percentage of the running average;
and
setting at least one of the first threshold and the second threshold according to the estimated waiting indicator.

7. The program product according to claim 6, wherein the shared resource includes a server offering a service and the entity includes a client for accessing the server for exploiting the service, further comprising program code for:
establishing a connection session on the server for the client, the connection session including a maintenance of a descriptor including context information of the client; and
wherein releasing the access further comprises closing the connection session and discarding the descriptor of the closed connection session.

8. The program product according to claim 6, further comprising program code for:
selecting an entity from the plurality of entities whose inactivity indicator is indicative of the longest non-activity; and
releasing the access granted to the selected entity.

9. The program product according to claim 6, further comprising program code for:
measuring a frequency of the detection of the critical condition; and
updating at least one of the first threshold and the second threshold according to the frequency.

10. The program product according to claim 6, further comprising program code for:
updating at least one of the first threshold and the second threshold according to a predefined time pattern.

11. A system for accessing a shared resource in a data processing system, comprising:
at least one computer, including:
a system for monitoring an activity of an entity granted access to the shared resource, wherein a plurality of entities have been granted access to the shared resource, and wherein a maximum number of granted accesses is allowed concurrently to the shared resource;
a system for releasing the access granted to the entity in response to an inactivity monitor reaching a first threshold indicative of a non-activity of the entity;
a system for detecting a critical condition of the shared resource, the detecting including receiving a request for accessing the shared resource from another entity after reaching the maximum number of accesses; and
a system for releasing the access granted to the entity in response to the critical condition when the inactivity indicator of the entity reaches a second threshold lower than the first threshold;
a system for determining an estimated waiting indicator by:
 determining actual longest idle times between granted accesses to the shared resource for a set of the plurality of entities;
 calculating a running average of a set of the actual longest idle times; and
 setting the estimated waiting indicator to a predefined percentage of the running average;
and
a system for setting at least one of the first threshold and the second threshold according to the estimated waiting indicator.

12. The system according to claim 11, wherein the shared resource includes a server offering a service and the entity includes a client for accessing the server for exploiting the service, further comprising:
a system for establishing a connection session on the server for the client, the connection session including a maintenance of a descriptor including context information of the client; and
wherein the system for releasing the access further comprises a system for closing the connection session and for discarding the descriptor of the closed connection session.

13. The system according to claim 11, further comprising:
a system for selecting an entity from the plurality of entities whose inactivity indicator is indicative of the longest non-activity; and
a system for releasing the access granted to the selected entity.

14. The system according to claim 11, further comprising:

a system for measuring a frequency of the detection of the critical condition; and a system for updating at least one of the first threshold and the second threshold according to the frequency.

15. The system according to claim 11, further comprising:

a system for updating at least one of the first threshold and the second threshold according to a predefined time pattern.

\* \* \* \* \*